Oct. 20, 1953     L. K. NEHER     2,656,535
NON-REFLECTING BACKGROUND FOR TESTING MICROWAVE EQUIPMENT
Filed Aug. 6, 1945
FIG.1
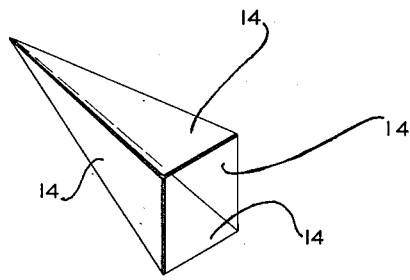
FIG.2          FIG.3
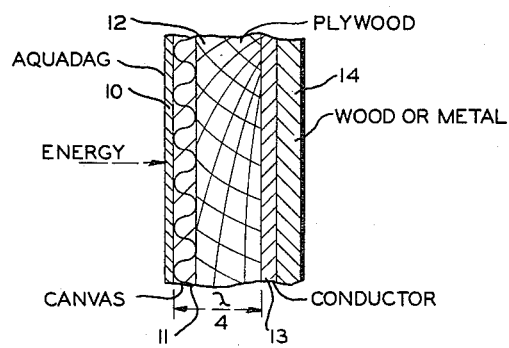 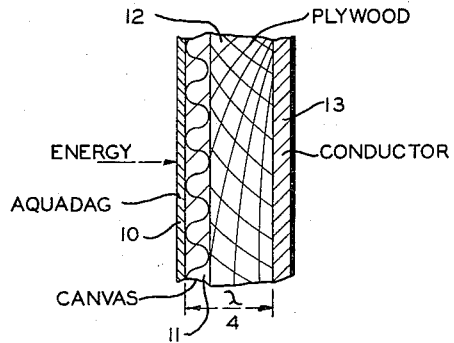
FIG. 4
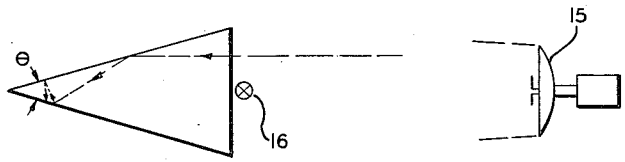
INVENTOR
LELAND K. NEHER
BY
Ralph L. Chappell
ATTORNEY Patented Oct. 20, 1953

2,656,535

UNITED STATES PATENT OFFICE 2,656,535

NONREFLECTING BACKGROUND FOR TESTING MICROWAVE EQUIPMENT

Leland K. Neher, Newton Corner, Mass., assignor, by mesne assignments, to the United States of America as represented by the Secretary of the Navy Application August 6, 1945, Serial No. 609,244

4 Claims. (Cl. 343—18)

1

This invention relates to a background device which is non-reflecting and more particularly to such a device which is non-reflecting as to incident high frequency electromagnetic radiation over a wide frequency range.

It is often desirable to prevent the reflection of electromagnetic radiation from surfaces or objects. For instance, where the field characteristics of an electromagnetic wave radiator, such as a dipole antenna or a wave guide are to be tested, it is more convenient to make such tests in the laboratory than in the open air where they are usually made because of the necessity of eliminating reflections. However, there have been, up to the present, no satisfactory background "drops" capable of absorbing a sufficient proportion of the incident energy when high frequency electromagnetic radiation tests of apparatus were being made. Absorbent bodies for electromagnetic waves known to the art have been used in the past and were fairly satisfactory at one wave length if proper care was exercised in their construction and design, but if the frequency changed appreciably these were quite unsatisfactory. My invention employs such absorbent bodies for electromagnetic waves in a new and novel manner to produce a non-reflecting background which is not critical to frequency changes over fairly wide limits and which is much more effective than a simple screen using such an absorbent body, even at the wave length at which the absorbent body was designed to be used.

Accordingly, one object of my invention is to provide a device to prevent or reduce reflection of electromagnetic radiation from the walls, ceiling, and floor of a testing cubicle while testing the radiation and other characteristics of high frequency antennas and antenna systems.

Another object is to provide a means to prevent or reduce reflection of electromagnetic radiation from extraneous surfaces.

A further object is to provide a means to prevent or reduce reflection of electromagnetic radiation from extraneous surfaces, such means not being critical to frequency changes over fairly wide limits.

Still another object is to provide a non-reflecting device which comprises a hollow pyramidally shaped reflector lined with any material which has the property of being an absorbent body for high frequency electromagnetic radiation.

Other and further objects will appear during the course of the following description when taken with the accompanying drawings in which:

Fig. 1 shows a perspective view of an embodiment of my invention.

2

Figs. 2 and 3 each show in cross-section alternative constructions of the wall of the embodiment disclosed in Fig. 1.

Fig. 4 illustrates a typical manner of using the device of Fig. 1.

In Fig. 1 is shown a hollow pyramidally shaped horn whose walls 14 may be made of any suitable rigid material, such as wood or metal. These walls may be lined with some energy absorbent body such as is shown in Fig. 2, or the walls may be dispensed with entirely and the outer material of the absorbent body itself dependent upon to give sufficient rigidity to the structure, as shown in Fig. 3.

Figs. 2 and 3, show a typical absorbent body for electromagnetic waves such as the "Salisbury Screen" disclosed in the patent application of Winfield W. Salisbury, Serial No. 486,608, filed May 11, 1943, now Patent No. 2,599,944, issued June 10, 1952. An energy reflecting layer 13, which is a good reflector for any of the electromagnetic energy reaching it, is disposed behind a partially absorbing layer 10, which has low conductivity. Layer 10 permits some of the radiation to pass through it and to reach reflecting layer 13, while reflecting the remainder of the radiation. Layer 10 is separated from reflecting layer 13 by a dielectric spacer 12, which may be of plywood, a distance equal to an odd quarter of the average wave length in the dielectric materials 11 and 12, of the electromagnetic radiation which the screen is designed to absorb. For practical purposes it is usually preferable to make this spacing equal to one-quarter of the average wave length through the dielectric media 11 and 12, since this brings layer 10 as close as possible to the reflecting layer 13 and thereby reduces the cross section and hence the bulkiness of the screen. Layer 10 is designed so that the radiation reflected from it will equal, or approach as nearly as possible, the radiation which has passed through it and is reflected from the reflecting layer 13. When such is the case and the proper spacing is used, at a point in front of or external to these layers, the electric and magnetic field from layer 10 will be 180° out of phase with the electric and magnetic field of the radiation reflected from the layer 13 and will cancel it entirely or greatly reduce it.

Reflecting layer 13 is preferably made as nearly a perfect reflector as possible, and since metal is substantially a perfect reflector, any kind of a metal surface may be used for this purpose. Layer 10 may comprise a coating of a quadag on a canvas backing 11, this coating being produced by covering the face of the canvas with a colloidal solution of graphite. For best results this coating should be of such thickness that the resistance of the entire layer 10 within the horn approximately equals 377 ohms divided by the square root of the relative dielectric constant of the medium in which the horn is to be used. Since air is the usual medium, and since the relative dielectric constant of air is approximately one, this latter factor ordinarily may be disregarded. Cloths coated with aquadag with a resistance of from 350 to 400 ohms have been found satisfactory.

The dimensions of the pyramidal horn are not critical nor fixed, although an apex angle of approximately 40° is preferable. Typical dimensions which were found satisfactory in certain tests were 9 feet square for the base of the pyramidal horn and a vertical height (from apex along a line perpendicular to the base) of 12 feet. This makes the apex angle approximately 41°. The base dimensions of the horn should be chosen so as to give suitable shielding of the background of the apparatus under test.

In Fig. 4, energy from a source 15 is directed, in part at least, toward the apparatus to be tested 16. Behind 16 is the pyramidally shaped horn of Fig. 1, the opening of this horn being placed in close proximity to 16. This is in order to achieve the fullest benefit from the horn, since such positioning affords widest shielding from any extraneous objects, surfaces, etc. in the background. The orientation of the horizontal and vertical axis of the horn with respect to those of the apparatus under test is unimportant (although the center line of the horn should coincide with the center line of the apparatus under test for best results), because the pyramidal horn is not sensitive to polarization changes. It will work equally well with horizontal, vertical, 45°, or any intermediate polarization.

Tests made with a horn of the dimensions as previously given lined with "Salisbury Screens," a "Salisbury Screen" alone 9 feet square, and a metal surface 9 feet square disclosed the following. Over a wave length variation of ±16% the use of the horn resulted in an energy return of from 50 to 55 decibels less than from the metal surface of equivalent size, whereas the use of a "Salisbury Screen" alone resulted in a reduction of from 8 to 22 decibels. The quarter wave length spacing of the "Salisbury Screens" was based on the mean wave length.

My invention has as its basis the theory of multiple reflection—any incident energy entering the device is reflected a number of times between the inner surfaces, being reduced in magnitude and effect with each reflection due to the properties of the absorbent bodies comprising such surfaces.

While I have described particular embodiments of my invention as required by the patent statutes, the principles of this invention are of broader application in ways which will be apparent to those skilled in the art.

What is claimed is:

1. A non-reflecting background device for radiated energy absorption over a wide frequency range comprising a pyramidally shaped horn, an energy reflecting layer disposed on the inner surface of said horn, a partially absorbing layer having a resistance substantially that of free space disposed over said reflecting layer, a layer of spacing material disposed between said reflecting surface and said partially absorbing layer and having a thickness substantially equal to an odd one quarter of the average wave length of the radiated energy, the vertex angle of said horn being such that energy waves not absorbed at their first incidence will be reflected toward another portion of the inner surface of said horn.

2. A non-reflecting background device for radiated energy absorption over a wide frequency range comprising a pyramidally shaped horn, an energy reflecting layer disposed on the inner surface of said horn, a partially absorbing layer disposed over said reflecting layer, and a layer of spacing material disposed between said partially absorbing layer and said reflecting surface and having a thickness substantially equal to an odd one-quarter of the average wave length of the radiated energy.

3. A non-reflecting background device for energy absorption over a wide frequency range comprising a plurality of laminated energy absorbing surfaces, each surface having a partially absorbing layer disposed over an energy reflecting layer and spaced therefrom by a layer of spacing material having a thickness of a quarter wave length of the incident energy, and means arranging said surfaces to reflect residual reflected energy from one of said surfaces to another of said surfaces, said surfaces being arranged to form a pyramidally-shaped horn, said horn having an apex angle of approximately 40 degrees.

4. A non-reflecting background device for absorbing incident high frequency electromagnetic radiation comprising, a plurality of laminated surfaces, each of said surfaces having a first layer of energy reflecting material, a second layer of dielectric material having a thickness substantially equal to an odd one-quarter of the average wave length of the incident energy and disposed over said first layer as a spacing layer, a third layer of partially reflecting partially transmitting material disposed over said second layer such that the electric and magnetic fields of incident energy reflected from said first layer are substantially equal in magnitude and 180° out of phase with the electric and magnetic fields of incident energy reflected from said third layer for absorption by cancellation in front of said surfaces, and means arranging said surfaces to reflect residual energy from one of said surfaces to another of said surfaces.

LELAND K. NEHER.

References Cited in the file of this patent

UNITED STATES PATENTS

| Number | Name | Date |
|---|---|---|
| 2,106,768 | Southworth | Feb. 1, 1938 |
| 2,293,181 | Terman | Aug. 18, 1942 |
| 2,293,839 | Linder | Aug. 25, 1942 |
| 2,316,151 | Barrow | Apr. 13, 1943 |
| 2,436,578 | Korn | Feb. 24, 1948 |
| 2,461,005 | Southworth | Feb. 8, 1949 |
| 2,464,006 | Tiley | Mar. 8, 1949 |
| 2,474,384 | Sunstein | June 28, 1949 |
| 2,594,971 | Moullin | Apr. 29, 1952 |

FOREIGN PATENTS

| Number | Country | Date |
|---|---|---|
| 802,728 | France | Sept. 14, 1936 |